United States Patent Office 3,151,147
Patented Sept. 29, 1964

3,151,147
O,O-DIALKYL O-1-SULFONYLVINYL AND O,O-DI-ALKYL O-1-SULFINYLVINYL PHOSPHATES
Donald D. Phillips and Loyal F. Ward, Jr., both of Modesto, Calif., assignors to Shell Oil Company, New York, N.Y., a corporation of Delaware
No Drawing. Filed Oct. 12, 1961, Ser. No. 144,526
13 Claims. (Cl. 260—461)

This invention relates to a new class of phosphorus-containing organic compounds which have been found to be particularly useful as agricultural chemicals.

The compounds provided by the invention are neutral esters of acids of pentavalent phosphorus wherein one ester group is a 1-sulfinylvinyl group or a 1-sulfonylvinyl group—that is, a vinyl group having an organo group linked to the alpha carbon atom thereof via a sulfur atom which is bonded by divalent bond to from one to two oxygen atoms. These compounds are described more particularly, but in terms of their genus, by the formula:

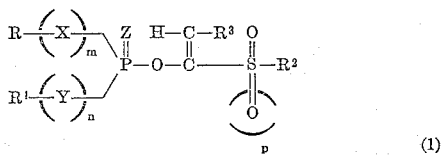
(1)

wherein R, R$^1$ and R$^2$ is each a lower molecular weight hydrocarbon group or substituted lower molecular weight hydrocarbon group, R$^3$ is hydrogen or a group represented by R, $m$, $n$ and $p$ each is 0 or 1, X and Y each is —O—, —S—, —NH or

wherein R$^0$ represents a group of the class represented by R, and Z is oxygen or sulfur, with the proviso that when $m$ and $n$ are both 1 and X and Y are each —O— or —S—, R and R$^1$ together can represent a divalent group, R and R$^1$ each representing one bond of that group. It is to be further understood that when either or both of X and Y are

the groups R and R$^0$, or R$^1$ and R$^0$, as the case may be, can together represent a divalent group.

The groups represented by R, R$^1$, R$^2$, R$^3$ and R$^0$ can be aliphatic, cycloaliphatic, aromatic, or mixed hydrocarbon groups. When aliphatic, they may be either straight chain or branched chain in configuration; preferably they are saturated. In terms of type, the suitable hydrocarbon groups include alkyl, cycloalkyl, aryl, aralkyl, and the like. Such groups may contain, for example, from one to ten, or more, carbon atoms each. Illustrative examples include the methyl, ethyl, n- and isopropyl groups, the various isomeric butyl, pentyl, hexyl, octyl, nonyl, and the like alkyl groups; the cyclopentyl, cyclohexyl and like cycloalkyl groups; the phenyl group; the naphthyl group, the benzyl, phenethyl, p-methylbenzyl and like aralkyl groups; the isomeric xylyl groups, the ethylphenyl groups, the 2,4- and 3,5-dimethylphenyl groups, and like alkaryl groups, and the like.

In those compounds of the foregoing formula wherein $m$ and $n$ both are 1, X and Y are each oxygen or sulfur and R and R$^1$ together represent a divalent group, it is preferred that the divalent group be an alkylene group of up to 10 carbon atoms, with from 1 to 5—preferably 2 or 3—carbon atoms in the chain thereof which bonds together the carbon atoms thereof which are bonded to the indicated oxygen or sulfur atoms represented by X and Y.

In those compounds of the foregoing formula wherein at least one of $m$ and $n$ is 1, and at least one of X and Y is

and R and R$^0$ (and/or R$^1$ and R$^0$) together represent a divalent group, it is preferred that the divalent group be an alkylene group of up to 10 carbon atoms, with from 4 to 5 carbon atoms in the chain thereof. Where the divalent chain contains 5 carbon atoms, it suitably may form with the nitrogen atom a piperidino group.

The suitable substituted hydrocarbon groups are those of the foregoing hydrocarbon groups which are substituted by one or more non-hydrocarbon substituents. The preferred substituents are halogen, particularly the middle halogens, bromine and chlorine; the nitro group; the cyano group; the amino groups represented by the formula

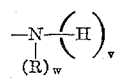

wherein R has the meaning already set out herein; $v$ is 0, 1 or 2, and $v+w=2$; the aliphaticoxycarbonyl groups, particularly carboalkoxy and carboalkoxyalkylene groups of up to eight carbon atoms; hydrocarbonoxy groups, R—O—, wherein R has the meaning already set out herein; and amido groups having the amino moiety set out above, and including amido groups of the formula

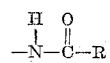

Illustrative examples of the non-hydrocarbon groups includes monohaloalkyl groups, such as the chloromethyl and bromomethyl groups, the 2-chloroethyl, 1-bromopropyl, 3-chloropropyl and the like; 1,2-dichloroethyl, 2,2-dibromoethyl, 3,3-dichloro-2-bromopropyl groups and the like; nitroalkyl groups such as the 2-nitroethyl group; halo-substituted aromatic groups such as the various isomeric chloro- and bromophenyl groups, the various isomeric polyhalophenyl groups, such as the 2,6-dichlorophenyl group, the 3,5-dibromophenyl group, and the like; amino-substituted groups, such as the 2-aminoethyl group, the 2-dimethylaminoethyl group and the like; the aniline group; the p-dimethylaminophenyl group, the p-ethylaminobenzyl group, and the like.

Of particular interest because of their insecticidal activity are the di(lower alkyl) beta-unsubstituted vinyl phosphates of this class substituted on the alpha carbon atom of the vinyl group by a mono- or di-nuclear aromatic sulfinyl or sulfonyl group—i.e., those compounds of the general formula wherein $m$ and $n$ both are 1, X, Y and Z each represent oxygen (—O—), and both R and R$^1$ are both lower alkyl, for example containing from one to four carbon atoms, R$^3$ is hydrogen and R$^2$ is mono- or di-nuclear aromatic. These particular compounds have the formula:

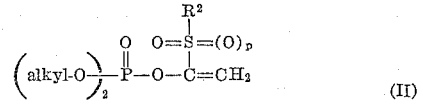
(II)

wherein "alkyl" represents an alkyl group of from one to four carbon atoms, $p$ has the meaning already set out herein, and R$^2$ represents the mono- or di-nuclear aromatic group bonded directly or through alkylene of from one to four carbon atoms to the indicated sulfur atom, and including both hydrocarbon and substituted-hydrocarbon groups, the suitable substituents being those preferred substituents already set out herein. The compounds of this class which apparently are of most interest as insecticides are the 1-(aromatic sulfinyl)vinyl esters—i.e., those compounds of Formula II wherein $p=0$.

In the compounds of this invention containing halogen, it is preferred that the halogen be a middle halogen—that is, bromine or chlorine.

To further illustrate and demonstrate the character of the compounds of this invention, the following species thereof are submitted:

Dimethyl 1-(phenylsulfinyl)vinyl phosphate
Dimethyl 1-(phenylsulfonyl)vinyl phosphate
O,O-dimethyl O-(1-(phenylsulfinyl)vinyl) phosphorothioate
Diethyl 1-(phenylsulfinyl)vinyl phosphate
Diethyl 1-(phenylsulfonyl)vinyl phosphate
1-(benzylsulfinyl)vinyl dimethyl phosphate
1-(benzylsulfonyl)vinyl di-n-propyl phosphate
1-(phenylsulfinyl)vinyl diisopropyl phosphate
1-(p-chlorophenylsulfinyl)vinyl dimethyl phosphate
1-(p-chlorophenylsulfonyl)vinyl dimethyl phosphate
Dimethyl 1-(p-tolylsulfinyl)vinyl phosphate
Dimethyl 1-(p-nitrophenylsulfinyl)vinyl phosphate
Dimethyl 1-(trichlorophenylsulfinyl)vinyl phosphate
Methyl 1-(phenylsulfinyl)vinyl dimethylphosphoramidate
Dibutyl 1-(phenylsulfinyl)vinyl phosphate
Methyl 1-(phenylsulfinyl)vinyl phenylphosphonate
1-(benzylsulfinyl)vinyl diisopropyl phosphate
Dimethyl 1-(2-naphthylsulfinyl)vinyl phosphate
Dimethyl 1-(methylsulfinyl)vinyl phosphate
Phenyl methyl 1-(phenylsulfinyl)vinyl phosphate
Benzyl ethyl 1-(p-chlorophenylsulfinyl)vinyl phosphate
Dibenzyl 1-(benzylsulfinyl)vinyl phosphate
Diphenyl 1-(methylsulfinyl)vinyl phosphate
Methyl p-chlorophenyl 1-(phenylsulfinyl)vinyl phosphate
Dimethyl 1-(phenylsulfinyl)-2-phenylvinyl phosphate
Dimethyl 1-(phenylsulfinyl)-2-methylvinyl phosphate
Dimethyl 1-(phenylsulfinyl)-2-benzylvinyl phosphate The compounds of this invention are readily prepared by oxidation of the corresponding 1-thiovinyl compounds, which in turn, are readily prepared by bringing together an alkyl ester of an acid of trivalent phosphorus with an ester of an alpha-halothiolacetic acid, this reaction being described by the equation:

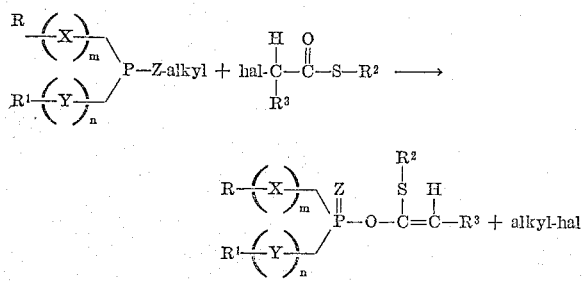

Preferably, "alkyl" represents a lower alkyl group, for example, a n-alkyl group of from one to four carbon atoms, and "hal" represents a middle halogen atom, that is, bromine or chlorine. The other symbols have the respective meanings already set forth herein.

As is set forth in Kosolapoff, "Organophosphorus Compounds," Wiley, 1950, the above-described esters of acids of trivalent phosphorus—that is, phosphites, phosphonites and phosphinites—are well-known classes of compounds.

The esters of alpha-halothiolacetic acid likewise are known, the method for their preparation being described by Dalgliesh and Mann, Journal of the Chemical Society (London), 1947, pages 559–560. The method involves reaction of a haloacetyl halide with an aqueous solution of an alkali metal salt of the appropriate mercaptan.

The preparation of a typical member of these S-esters of halothiolacetic acid is shown in the following example:

EXAMPLE I

*S-Phenyl Chlorothiolacetate*

81 grams of chloroacetyl chloride was added with stirring over a 5-minute period to a mixture of 55 grams of thiophenol, 29.4 grams of sodium hydroxide, 90 milliliters of water and 325 grams of ice. The mixture was stirred for ten additional minutes, until the ice was melted. The resulting solid was filtered, washed thoroughly with ice water, and air-dried to give 71 grams of crude product melting at 43–44° C. (literature: 45° C.). The product was then charcoaled in ether, and recrystallized by adding a mixture of 2–3 volumes of pentane/volume of ether and chilling. Result: 58 grams melting at 44–45° C. (two crops). Identified as S-phenyl chlorothiolacetate by elemental analysis, infrared spectrum analysis and comparison of physical properties to those reported in the literature.

Other esters of alpha-halothiolacetic acids which have been prepared in this same general manner include: S-benzyl chlorothiolacetate, S-p-chlorophenyl chlorothiolacetate, S-p-tolyl chlorothiolacetate, S-p-nitrophenyl chlorothiolacetate, S-phenyl alpha-chloro-alpha-methylthiolacetate, S-trichlorophenyl chlorothiolacetate, S-2-naphthyl chlorothiolacetate, S-methyl chlorothiolacetate, and methyl (chloroacetylthio)acetate.

The reaction between the thiolacetate and the phosphorus ester is effected by slowly mixing a moderate excess of the phosphorus ester with the thiolacetate, and controlling the temperature either by heating or cooling as necessary to maintain the reaction temperature within the range of from about 40° C. to about 150° C. The by-product alkyl halide may be removed from the reaction zone as it is formed by adjusting the pressure in the reaction system so that the alkyl halide volatilizes while the product and the reactants do not. However, in some cases the boiling point of the alkyl halide may be fairly close to the boiling point of the thiolacetate reactant, so that such a technique is undesirable; in such cases, the formed alkyl halide is most conveniently allowed to remain in the reaction zone until the desired reaction is substantially complete, and then is removed together with any unreacted thiolacetate by distillation of the reaction mixture under reduced pressure. Some of the higher molecular weight reactants and reaction products are solids at ordinary room temperatures; in these cases, use of an inert solvent such as xylene insures a fluid reaction system. To insure complete reaction between the phosphorus ester and the thiolacetate, the reaction mixture is heated for a reasonable time—e.g., from about one hour to about ten hours—after addition of all of the phosphorus ester. It will be found generally desirable to employ at least a 10% excess of the phosphorus ester, and excesses up to 50% will be found most effective in many cases in insuring that the reaction is complete within a reasonable time.

The thiovinyl ester product can be recovered by distillation under sufficiently low pressure that thermal decomposition of the product is avoided. With the higher molecular weight products, however, it is often convenient to recover the product by crystallization or by molecular distillation. Where the desired product has a higher boiling point than either of the reactants, the product can be obtained by merely stripping off the lower boiling materials to recover the product as residue. Such a product often is sufficiently pure to be used for agricultural purposes.

Because of the reactivity of the various compounds involved, it is usually necessary to exclude any substantial amount of water from the reaction and work-up zones.

Preparation of the 1-thiovinyl esters is described in U.S. Patent 3,069,313, issued December 18, 1962. Preparation of a typical species of the 1-thiovinyl esters is shown in the following example:

EXAMPLE II

Diethyl 1-(Phenylthio)Vinyl Phosphate 9.1 grams of triethyl phosphite was added to 9.3 grams of S-phenyl chlorothiolacetate, the mixture being maintained at 80–85° C. The mixture then was heated for one-half hour at 90–95° C. and then to 105° C., the heating requiring 30 minutes, then the mixture was held at 100–120° C. for an additional 60 minutes. An additional 2 grams of triethyl phosphite was then added and the mixture was heated at 100–125° C. for an additional 90 minutes. The mixture then was stripped to a kettle temperature of 125° C. at 0.05 Torr., to give 13.8 grams of product, identified as dimethyl 1-(phenylthio)-vinyl phosphate by elemental analysis and by infrared spectrum analysis.

The compounds of this invention are readily prepared by controlled peracid oxidation of the corresponding 1-thiovinyl compounds. The oxidation is carried out according to conventional techniques for the oxidation of thio compounds to the corresponding sulfoxides and sulfones, these techniques being described in the article by Swern, Chemical Reviews, 45, pp. 33–34 (1949). Thus, the 1-sulfinylvinyl compounds of this invention are conveniently and readily prepared by oxidizing the corresponding 1-thiovinyl compounds with a peracid, such as peracetic acid or monoperphthalic acid, one mole of the peracid being employed per mole of the thiovinyl compound. The reaction ordinarily is best conducted in a suitable solvent at about ordinary room temperature. Where aliphatic peracids such as peracetic acid are used, lower polyhaloalkanes such as chloroform, are suitable solvents. Suitable temperatures range from about 10° C. to about 40° C., with temperatures of from about 15° C. to about 35° C. generally being preferred. The 1-sulfinylvinyl product is recovered by conventional techniques—the final reaction mixture generally is washed with aqueous base, such as an aqueous solution of sodium bicarbonate or a dilute aqueous solution of sodium hydroxide to neutralize acid present, the organic phase is separated, dried, stripped of solvent, and the sulfinylvinyl product is recovered by distillation, ordinarily under reduced pressure to reduce the boiling temperature and thus avoid possible decomposition of the product.

The 1-sulfonylvinyl compounds of this invention are conveniently and readily produced by oxidizing the corresponding 1-thiovinyl compounds in the manner described for producing the 1-sulfinylvinyl compounds of this invention, except that at least two moles of peracid are employed per mole of the thiovinyl compound. Generally, a small excess—say, 5–10% excess—of peracid is desirable to speed up and insure complete reaction within a reasonable reaction time.

Preparation of typical species of the compounds of this invention is described in the following examples. These examples are intended to be illustrative and exemplary in character only and are not to be considered as limiting the invention in any way not expressed in the appended claims.

EXAMPLE III

Diethyl 1-(Phenylsulfinyl)Vinyl Phosphate 200 ml. of 40% aqueous peracetic acid was poured into 250 milliliters of chloroform, then the mixture was saturated with ammonium sulfate. 57.6 grams of diethyl 1-(phenylthio)vinyl phosphate, prepared as in Example II, was mixed with 150 milliliters of chloroform, and to the mixture was added over a two and one-quarter hour period 136 milliliters of the peracetic acid solution containing 15.9 g. of peracetic acid, the temperature of the reaction mixture being held at 20–30° C. The mixture then was stirred for 1 hour at 25–30° C., then was washed with aqueous sodium bicarbonate solution until the washes were basic, and the mixture was stripped to a kettle temperature of 50° C. at 0.5 Torr. The residue was distilled on a molecular still to give 42 grams of product boiling at 115–120° C. at 8 microns pressure, $n^{25}_D$ 1.5173. The product was identified by elemental analysis:

Analysis for $PSO_5C_{12}H_{17}$ (percent by weight): P, 10.2; S, 10.5. Found: P, 10.5; S, 10.5.

EXAMPLE IV

Dimethyl 1-(p-Chlorophenylsulfinyl)Vinyl Phosphate

To 50 grams of dimethyl 1-(p-chlorophenylthio)vinyl phosphate (prepared as shown in U.S. Patent 3,069,313) in 65 milliliters of chloroform, there was added with stirring 127 milliliters of 0.102 gram/milliliter solution of peracetic acid in chloroform. The addition took place over a period of 1.5 hours, and the reaction mixture was maintained at 20–25° C. The reaction mixture was washed three times with 5% aqueous sodium hydroxide solution, and twice thereafter with water. An emulsion formed; the aqueous phase was saturated with sodium chloride and the mixture was allowed to separate into aqueous and organic phases. The organic phase was separated, dried and stripped under water aspirator vacuum at 15° C.; the residue was stripped in a molecular still at 110° C. at 0.001 Torr. On standing, a solid crystallized out; the mixture was filtered and the filtrate was distilled at 120° C. and 0.001 Torr, $n^{25}_D$ 1.5431. 23 grams of product identified by elemental analysis as dimethyl 1-(p-chlorophenylsulfinyl)vinyl phosphate were recovered.

Analysis for dimethyl 1-(p-chlorophenylsulfinyl)vinyl phosphate (percent by weight): P, 10.0; S, 10.2. Found: P, 10.0; S, 10.8.

The identity of the product was confirmed by infrared spectrum analysis.

EXAMPLE V

Diethyl 1-(Benzylsulfinyl)Vinyl Phosphate

Diethyl 1-(benzythio)vinyl phosphate was oxidized with peracetic acid in the manner shown in Example IV to give diethyl 1-(benzylsulfinyl)vinyl phosphate, identified by elemental analysis:

Analysis for $PSO_5C_{13}H_{19}$ (percent by weight): P, 9.8; S, 10.1. Found: P, 9.9; S, 10.2.

The identity of the product was confirmed by infrared spectrum analysis.

EXAMPLE VI

Dimethyl-1-(Methylsulfinyl)Vinyl Phosphate

Dimethyl 1-(methylthio)vinyl phosphate (prepared as shown in U.S. Patent 3,069,313) was oxidized with peracetic acid in the manner shown in Example III to give dimethyl 1-(methylsulfinyl)vinyl phosphate, identified by elemental analysis:

Analysis for $PSO_5C_5H_{11}$ (percent by weight): P, 14.5; S, 15.0. Found: P, 14.6; S, 15.4.

The identity of the product was confirmed by infrared spectrum analysis.

EXAMPLE VII

Dimethyl 1-(p-Chlorophenylsulfonyl)Vinyl Phosphate

Dimethyl 1-(p-chlorophenysulfonyl)vinyl phosphate was prepared from dimethyl 1-(p-chlorophenylthio)vinyl phosphate in essentially the same manner as set out in Example IV for the preparation of the corresponding sulfinyl compound, with the exception that 2.1 moles of peracetic acid were employed per mole of thiovinyl phosphate. The product was identified by elemental analysis.

Analysis (percent by weight) for dimethyl 1-(p-chlorophenylsulfonyl)vinyl phosphate: P, 9.5; S, 9.8. Found: P, 9.2; S, 10.3.

The identity of the product was confirmed by infrared spectrum analysis.

EXAMPLE VIII

Diethyl 1-(Benzylsulfonyl)Vinyl Phosphate

Diethyl 1-(benzylthio)vinyl phosphate was oxidized with peracetic acid in the manner shown in Example IV, except employing 2.1 moles of peracetic acid per mole of the thiovinyl phosphate, to give diethyl 1-(benzylsulfonyl) vinyl phosphate, identified by elemental analysis.

Analysis (percent by weight) for diethyl 1-(benzylsulfonyl)vinyl phosphate: P, 9.3; S, 9.6. Found: P, 9.3; S, 9.9.

The identity of the product was confirmed by infrared spectrum analysis.

EXAMPLE IX

Diethyl 1-(p-Chlorophenylsulfonyl)Vinyl Phosphate

Diethyl 1-(p-chlorophenylthio)vinyl phosphate was oxidized by peracetic acid to diethyl 1-(p-chlorophenylsulfonyl)vinyl phosphate in the manner set out in Example VII, employing 2.1 moles of peracetic acid per mole of the thiovinyl phosphate. The product was identified by elemental analysis.

Analysis (percent by weight) for diethyl 1-(p-chlorophenylsulfonyl)vinyl phosphate: P, 8.8; S, 9.0; Cl, 10.0. Found: P, 9.0; S, 9.3; Cl, 10.3.

The identity of the product was confirmed by infrared spectrum analysis.

EXAMPLE X

Dimethyl1-(Methylsulfonyl)Vinyl Phosphate

Dimethyl 1-(methylthio)vinyl phosphate was oxidized by peracetic acid to dimethyl 1-(methylsulfonyl)vinyl phosphate in the manner set out in Example III, employing 2.07 moles of peracetic acid per mole of the thiovinyl phosphate. The product was identified by elemental analysis.

Analysis (percent by weight) for dimethyl 1-(methylsulfonyl)vinyl phospate: P, 13.5; S, 13.9. Found: P, 13.8; S, 14.1.

The identity of the product was confirmed by infrared spectrum analysis.

EXAMPLE XI

Dimethyl 1-(Methylsulfonyl)Vinyl Phosphate

In the manner set out in Example III, monoperphthalic acid was used to oxidize dimethyl 1-(methylthio)vinyl phosphate to dimethyl 1-(methylsulfonyl)vinyl phosphate. In this case, 2.1 moles of the monoperphthalic acid were used per mole of the thiovinyl phosphate, and ether was used as solvent. The product was identified by elemental analysis (P, 13.6; S, 13.7) and by infrared spectrum analysis.

EXAMPLE XII

Dimethyl 1-(Trichlorophenylsulfonyl)Vinyl Phosphate

Dimethyl 1-(trichlorophenylthio)vinyl phosphate was oxidized to dimethyl 1-(trichlorophenylsulfonyl)vinyl phosphate by monoperphthalic acid in the manner set out in Example XI. The product was identified by elemental analysis.

Analysis (percent by weight) for dimethyl 1-(trichlorophenylsulfonyl)vinyl phosphate: P, 7.8; S, 8.1; Cl, 26.9. Found: P, 7.8; S, 7.8; Cl, 26.1.

The identity of the product was confirmed by infrared spectrum analysis.

EXAMPLE XIII

Diethyl 1-(Benzylsulfonyl)Vinyl Phosphate

Diethyl 1-(benzylthio)vinyl phosphate was oxidized to dimethyl 1-(benzylsulfonyl)vinyl phosphate by monoperphthalic acid in the manner set out in Example XI. The product was identified by elemental analysis.

Analysis (percent by weight) for diethyl 1-(benzylsulfonyl)vinyl phosphate: P, 9.7; S, 10.0. Found: P, 9.8; S, 10.6.

The identity of the product was confirmed by infrared spectrum analysis.

Compounds of this invention have been found to exhibit a high level of insecticidal activity with respect to a variety of insects and mites. In particular, certain of them have been found to be outstanding miticides and aphicides.

By the term "insects" is meant not only the members of the class Insecta, but also related to similar organisms belonging to allied classes of arthropods, and including mites, ticks, spiders, wood lice, and the like.

The compounds of this invention can be employed for insecticidal purposes by the use of any of the methods which are conventionally employed in that art. For example, the compounds can either be sprayed or otherwise applied in the form of solutions or dispersions, or they can be sorbed on inert, finely divided solids and applied as dusts. Useful solutions for application by spraying, brushing, dipping, and the like, can be prepared by using as the solvent any of the well known inert horticultural carriers, including neutral hydrocarbons such as kerosene and other light mineral oil distillates of intermediate viscosity and volatility. Adjuvants, such as spreading or wetting agents, can also be included in the solutions, representing materials of this character being fatty acid soaps, rosin salts, saponins, gelatin, casein, long-chain fatty alcohols, alkyl aryl sulfonates, long-chain alkyl sulfonates, phenol-ethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime, gypsum, pyrophyllite, and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insect species to be controlled, a proper consideration and resolution of these factors being within the skill of those versed in the insecticide art. In general, however, the compounds of this invention are effective in concentrations of from about 0.01% to 0.5% based upon the total weight of the composition, though under some circumstances as little as about 0.00001% or as much as 2% or even more of the compound can be employed with good results from an insecticidal standpoint. Concentrates suitable for sale for dilution in the field may contain as much as 25–50% by weight, or even more, of the insecticide.

When employed as an insecticide, a compound of this invention can be employed either as the sole toxic ingredient of the insecticidal composition or can be employed in conjunction with other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead, and/or fluorine.

The following examples demonstrate the insecticidal properties of typical compounds of this invention.

EXAMPLE XIV

Solutions of typical compounds of the invention were made up employing either a neutral petroleum distillate boiling within the kerosene range or acetone as solvent. The solutions were tested for toxicity against the two-spotted spider mite, *Tetranychus telarius*, and the pea aphid, *Macrosiphum pisi*, by spraying groups of plants infested with these insects under controlled conditions which varies from one test to the other only with respect to the test material and its concentration. These toxicities were compared to the toxicities of parathion, an insecticide widely used for control of these insects. In each set of tests the conditions were directly comparable, i.e., the same test insect, same species of plant, environment, etc., were used and the concentration of active material in each case was the same. The toxicities are expressed in terms of the relationship between the amount of parathion required to produce 50% mortality of the test insects and the amount of the test material required to produce the same mortality. Assigning parathion an arbitrary rating of 100, the toxicity of the test materials is expressed in terms of the toxicity index which compares the activity on a percentage basis with that of the parathion. That is to say, a test compound having a toxicity index of 50 would be half as active as parathion, while one having a toxicity index of 200 would be twice as active as parathion.

The results obtained in these tests are set out in Table I.

TABLE I

| Test Compound | Toxicity Index | |
|---|---|---|
| | Two-spotted mite | Pea aphid |
| Diethyl 1-(phenylsulfinyl)vinyl phosphate | 2,000 | 170 |
| Diethyl 1-(phenylsulfonyl)vinyl phosphate | 470 | 80 |
| Dimethyl 1-(p-chlorophenylsulfinyl)vinyl phosphate | 1,280 | 43 |
| Diethyl 1-(p-chlorophenylsulfonyl)vinyl phosphate | 95 | |
| Dimethyl 1-(trichlorophenylsulfonyl)vinyl phosphate | 230 | |
| Dimethyl 1-(methylsulfinyl)vinyl phosphate | 1,040 | 120 |
| Dimethyl 1-(methylsulfonyl)vinyl phosphate | 715 | 60 |
| Dimethyl 1-(p-chlorophenylsulfonyl)vinyl phosphate | 390 | |
| Diethyl 1-(benzylsulfonyl)vinyl phosphate | 140 | 75 |
| Diethyl 1-(benzylsulfinyl)vinyl phosphate | 400 | 210 |

EXAMPLE XIV

The toxicity of several of the compounds of the invention toward the common housefly, *Musca domestica*, was determined, the method used being that described by Y. P. Sun, 43, Journal of Economic Entomology, 45 et seq. (1950). Table II shows the concentration of test material in the sprayed solution required to cause approximately 50% mortality of the test insect—this concentration is denoted the $LC_{50}$ concentration. The $LC_{50}$ concentration is expressed in grams of test compound per 100 milliliters of solvent.

TABLE II

Test compound: $LC_{50}$
- Diethyl 1-(phenylsulfinyl)vinyl phosphate __ 0.033
- Diethyl 1-(phenylsulfonyl)vinyl phosphate _____ 0.047
- Dimethyl 1-(p-chlorophenylsulfinyl)vinyl phosphate _____ 0.031
- Dimethyl 1-(methylsulfinyl)vinyl phosphate _____ 0.0023
- Dimethyl 1-(methylsulfonyl)vinyl phosphate _____ 0.0115

Compounds of this invention also are active nematocides, dimethyl 1-(p-chlorophenylsulfinyl)vinyl phosphate, diethyl 1-(benzylsulfonyl)vinyl phosphate, and dimethyl 1-(p-chlorophenylsulfonyl)vinyl phosphate being particularly active.

These compounds can be employed as nematocides through use of conventional techniques.

We claim as our invention:

1. Neutral ester of phosphoric acid, having the formula:

$$\left(\text{alkyl-O}\right)_2 \overset{O}{\underset{\parallel}{P}}-O-\overset{CH_2}{\underset{|}{C}}-\overset{O}{\underset{\parallel}{S}}-R$$
$$(O)_p$$

wherein each alkyl independently represents alkyl of from 1 to 4 carbon atoms; R represents a member of the group consisting of alkyl of 1 to 4 carbon atoms, phenyl, phenyl substituted by one to a plurality of middle halogen atoms, alkyl-substituted phenyl wherein each alkyl contains from 1 to 4 carbon atoms, phenalkyl wherein each alkyl contains 1 to 4 carbon atoms, alkyl phenyl alkyl wherein each alkyl contains from 1 to 4 carbon atoms, and $p$ is a whole number from 0 to 1.

2. Neutral ester of phosphoric acid, having the formula:

$$\left(\text{alkyl-O}\right)_2 \overset{O}{\underset{\parallel}{P}}-O-\overset{CH_2}{\underset{|}{C}}-\overset{O}{\underset{\parallel}{S}}\text{-phenyl}$$

wherein each alkyl independently represents alkyl of from 1 to 4 carbon atoms.

3. Neutral ester of phosphoric acid, having the formula:

$$\left(\text{alkyl-O}\right)_2 \overset{O}{\underset{\parallel}{P}}-O-\overset{CH_2}{\underset{|}{C}}-\overset{O}{\underset{\parallel}{S}}-R''$$

wherein each alkyl independently represents alkyl of from 1 to 4 carbon atoms, and $R''$ is phenyl substituted by from one to a plurality of halogen atoms.

4. Neutral ester of phosphoric acid, having the formula:

$$\left(\text{alkyl-O}\right)_2 \overset{O}{\underset{\parallel}{P}}-O-\overset{CH_2}{\underset{|}{C}}-\overset{O}{\underset{\parallel}{S}}-R''$$

wherein each alkyl independently represents alkyl of from 1 to 4 carbon atoms, and $R''$ is phenalkyl wherein the alkylene chain bonding the phenyl moiety to the indicated sulfur atom contains from 1 to 4 carbon atoms.

5. Neutral ester of phosphoric acid, having the formula:

$$\left(\text{alkyl-O}\right)_2 \overset{O}{\underset{\parallel}{P}}-O-\overset{CH_2}{\underset{|}{C}}-\overset{O}{\underset{\parallel}{S}}\text{-benzyl}$$

wherein each alkyl independently represents alkyl of from 1 to 4 carbon atoms.

6. Neutral ester of phosphoric acid, having the formula:

$$\left(\text{alkyl-O}\right)_2 \overset{O}{\underset{\parallel}{P}}-O-\overset{CH_2}{\underset{|}{C}}-\overset{O}{\underset{\parallel}{\underset{O}{S}}}\text{-phenyl}$$

wherein each alkyl independently represents alkyl of from 1 to 4 carbon atoms.

7. Neutral ester of phosphoric acid, having the formula:

$$\left(\text{alkyl-O}\right)_2 \overset{O}{\underset{\parallel}{P}}-O-\overset{CH_2}{\underset{|}{C}}-\overset{O}{\underset{\parallel}{\underset{O}{S}}}-R''$$

wherein each alkyl independently represents alkyl of from 1 to 4 carbon atoms, and $R''$ is phenyl substituted by from one to a plurality of halogen atoms.

8. Neutral ester of phosphoric acid, having the formula:

$$\left(\text{alkyl-O}\right)_2 \overset{O}{\underset{\parallel}{P}}-O-\overset{CH_2}{\underset{|}{C}}-\overset{O}{\underset{\parallel}{\underset{O}{S}}}-R''$$

wherein each alkyl independently represents alkyl of from 1 to 4 carbon atoms, and $R''$ is phenalkyl hydrocarbon group of up to 10 carbon atoms wherein the alkylene chain bonding the phenyl moiety to the indicated sulfur atom contains from 1 to 4 carbon atoms.

9. Neutral ester of phosphoric acid, having the formula:

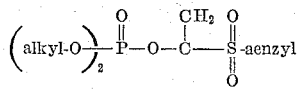

wherein each alkyl independently represents alkyl of from 1 to 4 carbon atoms.

10. Dimethyl 1-(phenylsulfinyl)vinyl phosphate.
11. Diethyl 1-(phenylsulfinyl)vinyl phosphate.
12. Dimethyl 1-(p-chloro-phenylsulfinyl)vinyl phosphate.
13. Dimethyl 1-(methylsulfinyl)vinyl phosphate.

References Cited in the file of this patent
UNITED STATES PATENTS

| | | |
|---|---|---|
| 2,952,700 | Lorenz et al. | Sept. 13, 1960 |
| 2,956,074 | Dorken et al. | Oct. 11, 1960 |
| 2,961,457 | Pohlemann et al. | Nov. 22, 1960 |
| 2,963,505 | Muhlmann | Dec. 6, 1960 |
| 2,999,874 | Schrader | Sept. 12, 1961 |
| 3,042,703 | Schegk et al. | July 3, 1962 |
| 3,069,313 | Ward et al. | Dec. 18, 1962 |
| 3,071,610 | Senkbeil | Jan. 1, 1963 |
| 3,077,431 | Baker et al. | Feb. 12, 1963 |
| 3,080,276 | Chupp | Mar. 5, 1963 |

OTHER REFERENCES

Fukuto et al.: "J. Econ. Entomol.," vol. 48, pages 347, 354 (1955).